United States Patent [19]

Ozawa et al.

[11] Patent Number: 5,369,166

[45] Date of Patent: Nov. 29, 1994

[54] COPOLYMER LATEX, METHOD FOR PREPARING THE SAME AND USE THEREOF

[75] Inventors: Yutaka Ozawa; Hisanori Ohta, both of Tokyo, Japan

[73] Assignee: Nippon Zeon Co., Ltd., Tokyo, Japan

[21] Appl. No.: 24,763

[22] Filed: Mar. 2, 1993

[30] Foreign Application Priority Data

Sep. 30, 1991 [JP] Japan ............................ 3-276201
Mar. 3, 1992 [JP] Japan ............................ 4-80357
Dec. 22, 1992 [JP] Japan ............................ 4-356523

[51] Int. Cl.$^5$ .......................... C08L 33/06; C08F 4/28
[52] U.S. Cl. ......................... 524/560; 524/562; 524/841; 526/227; 526/318.6
[58] Field of Search .................. 524/560, 562, 821; 526/318.6, 227

[56] References Cited

U.S. PATENT DOCUMENTS 4,102,844 7/1978 Schwinum et al. ................ 524/745

FOREIGN PATENT DOCUMENTS 53-101036 of 0000 Japan .

OTHER PUBLICATIONS

Database WPI Section Ch, Week 0575 Derwent Publications Ltd., London, GB; Class A, AN 75-08380W & JP-A-49 113 891 (Japan Zeon Co) 30 Oct. 1974.
Chemical Abstracts, vol. 85, No. 16, 1976, Columbus, Ohio, abstract No. 109740x, Basov B. K. et al. —Synthesis . . . ' & 'Prom-st. Stint. Kauch. (4), 12–14 '.
Chemical Abstracts, vol. 96, No. 26, 1982, Columbus, Ohio, abstract No. 219041e, Jarm V. et al. 'Emulsion . . . ' & 'Polymeri (Zagreb), 3(1), 291 ∝ 31'.

*Primary Examiner*—Kriellion S. Morgan
*Attorney, Agent, or Firm*—Sherman and Shalloway

[57] ABSTRACT

A copolymer latex is provided which comprises 30 to 90% by weight of a conjugated diene monomer unit, 9 to 50% by weight of an ethylenically unsaturated nitrile monomer unit, 0.1 to 20% by weight of an ethylenically unsaturated acid monomer unit and 0 to 20% by weight of an other ethylenically unsaturated monomer unit copolymerizable therewith, having a polystyrene-converted weight average molecular weight of 50,000 to 500,000, and containing 45% or less of methyl ethyl ketone insoluble matter. The latex is presented by emulsion polymerization using a polymerization initiator containing a peroxide whose decomposition temperature giving a half-life period of 10 hours is 100° C. or higher and a reducing agent. The latex is used advantageously for dip molding.

12 Claims, No Drawings

COPOLYMER LATEX, METHOD FOR PREPARING THE SAME AND USE THEREOF

The present invention relates to a copolymer latex, a method for preparing the same and molded products thereof. More particularly, the present invention relates to a copolymer latex having high oil resistance and high mechanical strength as well as soft drape, a method for preparing the same and molded products thereof.

Carboxyl-modified nitrile/diene copolymer latexes are widely used for preparing paints, foamed rubber, adhesives, dip-molded products and so on.

The carboxyl-modified nitrile/diene copolymer latexes have increased oil resistance whereas they have decreased impact resilience and harder drape according as the content of nitrile increases. On the contrary, with decreasing nitrile content, the latex has softer drape and decreased oil resistance and decreased mechanical strength.

It is desired to balance softness of drape with mechanical strength and oil resistance, which are conflicting each other and increase the levels of these characteristics.

To meet this desire, there has been proposed, for example, a method in which a carboxyl-modified nitrile/diene copolymer latex and a natural rubber latex are laminated alternately one on another for molding. As another proposal, a method has been known in which a mixed latex composed of a carboxyl-modified nitrile/diene copolymer latex and a carboxyl-modified polyisoprene rubber latex (Japanese Patent Application Laid-Open No.-101036/1978).

However, these method are disadvantageous in that not only do they require use of a copolymer latex which has a soft drape but also they give products having insufficient characteristics such as oil resistance, mechanical strength, and drape. Hence there has been a keen desire for a latex of a single carboxyl-modified nitrile/diene copolymer which latex has high oil resistance and high mechanical strength as well as soft drape.

The mechanical strength and softness of drape of a copolymer depends on the branching structure of the copolymer. Incidentally, carboxyl-modified nitrile/diene copolymers prepared by conventional methods contain many branches in structure and the content of methyl ethyl ketone insoluble matter is large. In particular, increase in the content of nitrile results in increase in the amount of the methyl ethyl ketone insoluble matter.

In order to decrease the amount of methyl ethyl ketone insoluble matter, a method has been proposed which performs polymerization with adding a large amount of a chain transfer agent to starting monomers. This method is also disadvantageous since sometimes it gives rise to a copolymer having a low molecular weight, or the activity of the polymerization initiator is lost during polymerization to suppress the polymerization conversion at a lower level. Thus, it has been difficult to obtain a carboxyl-modified nitrile/diene copolymer latex having a high molecular weight, a low content of methyl ethyl ketone insoluble matter, and a high content of nitrile.

Therefore, an object of the present invention is to provide a carboxyl-modified nitrile/diene copolymer latex having high oil resistance and high mechanical strength as well as soft drape.

Another object of the present invention is to provide a method for preparing a carboxyl-modified nitrile-diene copolymer latex having a high content of nitrile, a high molecular weight, and a low content of methyl ethyl ketone insoluble matter.

Still another object of the present invention is to provide a molded product having high oil resistance and high mechanical strength as well as soft drape.

As a result of extensive research, the present inventors have now found that a carboxyl-modified nitrile/diene copolymer having a high molecular weight, a low content of methyl ethyl ketone insoluble matter can give rise to a copolymer having high oil resistance and high mechanical strength as well as soft drape.

Also, the present inventors have found that emulsion polymerization of an ethylenically unsaturated nitrile monomer, an ethylenically unsaturated acid monomer and a conjugated diene monomer using as a polymerization initiator a specified peroxide and a reducing agent can produce a carboxyl-modified nitrile/diene copolymer latex having a high molecular weight and a low content of methyl ethyl ketone insoluble matter.

Further, the present inventors have found that molding of a coagulated product of carboxyl-modified nitrile/diene copolymer latex having a high molecular weight, a low content of methyl ethyl ketone insoluble matter, and a high content of nitrile can give rise to a molded product having high oil resistance and high mechanical strength as well as soft drape.

Thus, according to a first aspect of the present invention, there is provided a copolymer latex comprising 30 to 90% by weight of a conjugated diene monomer unit, 9 to 50% by weight of an ethylenically unsaturated nitrile monomer unit, 0.1 to 20% by weight of an ethylenically unsaturated acid monomer unit, and 0 to 20% by weight of an other ethylenically unsaturated monomer unit copolymerizable therewith, having a polystyrene-converted weight average molecular weight of 50,000 to 500,000, and containing 45% or less of a methyl ethyl ketone insoluble matter.

According to a second aspect of the present invention, there is provided a method for preparing a copolymer latex, comprising the step of emulsion polymerizing a conjugated diene monomer, an ethylenically unsaturated nitrile monomer, an ethylenically unsaturated acid monomer, and an other ethylenically unsaturated monomer copolymerizable therewith using a polymerization initiator consisting of a peroxide whose decomposition temperature giving a half-life period of 10 hours is 100° C. and a reducing agent.

Further, according to a third aspect of the present invention, there is provided a molded product consisting essentially of a coagulated product of a copolymer latex comprising 30 to 90% by weight of a conjugated diene monomer unit, 9 to 50% by weight of an ethylenically unsaturated nitrile monomer unit, 0.1 to 20% by weight of an ethylenically unsaturated acid monomer unit, and 0 to 20% by weight of an other ethylenically unsaturated monomer unit copolymerizable therewith, having a polystyrene-converted weight average molecular weight of 50,000 to 500,000, and containing 45% or less of a methyl ethyl ketone insoluble matter.

Hereinafter, the present invention will be described in detail.

The latex of the present invention is a copolymer latex comprising a conjugated diene monomer unit, an ethylenically unsaturated nitrile monomer unit, an ethylenically unsaturated acid monomer unit, and an other ethylenically unsaturated monomer unit copolymerizable therewith.

As the ethylenically unsaturated nitrile monomer, there can be cited, for example, acrylonitrile, methacrylonitrile, fumaronitrile, α-chloroacrylonitrile, α-cyanoethylacrylonitrile, etc. These ethylenically unsaturated nitrile monomers may be used singly or two or more of them may be used in combination.

The amount of the ethylenically unsaturated nitrile monomer unit is 9 to 50% by weight, preferably 20 to 45% by weight, and more preferably 30 to 45% by weight, of total monomer unit in the copolymer. If the amount of this unit is less than 9% by weight, the oil resistance of the resulting copolymer is aggravated while if it exceeds 50% by weight, the drape of the copolymer becomes harder.

The latex of the present invention is featured by high molecular weight and low content of methyl ethyl ketone insoluble matter despite increased amount of ethylenically unsaturated nitrile monomer unit.

In the latex of the present invention, the polystyrene converted weight average molecular weight (hereinafter referred to simply as "molecular weight") of the copolymer is within the range of 50,000 to 500,000, and preferably 80,000 to 200,000. If the molecular weight is smaller than 50,000, the tensile strength of the copolymer is low and cracks tend to occur. On the other hand, if the molecular weight is larger than 500,000, the drape of the copolymer becomes hard, and shrinkage tends to occur at the time of molding.

The latex of the present invention, the content of methyl ethyl ketone insoluble matter (hereinafter referred to as "MEK insoluble matter") is 45% by weight or less, preferably 25% by weight or less, and more preferably 10% by weight or less. The content of more than 45% by weight is undesirable since the drape of the copolymer becomes hard.

As the conjugated diene, there can be used, for example, 1,3-butadiene, isoprene, 2,3-dimethyl-1,3-butadiene, 2-ethyl-1,3-butadiene, 1,3-pentadiene, chloroprene, etc. In particular, 1,3-butadiene or isoprene is used preferably. These conjugated diene monomers may be used singly or two or more of them may be used in combination.

The amount of the conjugated diene monomer unit is 30 to 90% by weight, and preferably 35 to 80% by weight, of total monomer units. If this amount is less than 30% by weight, the drape of the copolymer becomes hard while it is undesirable for this amount to exceed 90% by weight since the oil resistance of the copolymer is aggravated and tensile strength and tear strength decrease.

The ethylenically unsaturated acid monomer is not limited particularly so far as it is an ethylenically unsaturated monomer containing an acid group such as a carboxyl group, a sulfonic acid group, or an acid anhydride group. There can be used, for example, ethylenically unsaturated carboxylic acids such as acrylic acid, methacrylic acid, itaconic acid, maleic acid, and fumaric acid; polycarboxylic acid anhydrides such as maleic anhydride, and citraconic anhydride; ethylenically unsaturated sulfonic acids such as styrenesulfonic acid; ethylenically unsaturated polycarboxylic acid monoesters such as monobutyl fumarate, monobytyl maleate, and mono-2-hydroxypropyl maleate; and so on. These ethylenically unsaturated acid monomers may be used as alkali metal salts or ammonium salts. These ethylenically unsaturated acid monomers may be used singly or two or more of them may be use in combination.

The amount of the ethylenically unsaturated acid monomer unit is 0.1 to 20% by weight, preferably 1 to 15% by weight, and more preferably 2 to 10% by weight, of total monomer units. If this amount is less than 0.1% by weight, the tensile strength of the copolymer decreases while it exceeds 20% by weight, the tear strength of the copolymer decreases and the drape becomes hard.

As the other ethylenically unsaturated monomer copolymerizable with the conjugated diene monomer, the ethylenically unsaturated nitrile monomer and the ethylenically unsaturated acid monomer, there can be cited, for example, aromatic vinyls such as styrene, alkylstyrenes, and vinylnaphthalene; fluoroalkyl vinyl ethers such as fluoroethyl vinyl ether; ethylenically unsaturated amides such as (meth)acrylamide, N-methylol(meth)acrylamide, N,N-dimethylol(meth)acrylamide, N-methoxymethyl(meth)acrylamide, N-propoxymethyl(meth)-acrylamide; vinylpyridines; vinylnorbornene; unconjugated dienes such as dicyclopentadiene, and 1,4-hexadiene; ethylenically unsaturated carboxylic acid esters such as methyl (meth)acrylate, methyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl, (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyehtyl (meth)acrylate, hydroxypropyl (meth)acrylate, glycidyl (meth)acrylate, and dimethylaminoetyl (meth)acrylate; and so on. These ethylenically unsaturated monomers may be used singly or two or more of them may be used in combination.

The amount of these ethylenically unsaturated monomer unit is 20% by weight or less of total monomer unit in the copolymer.

The method for preparing a latex according to the present invention is featured by emulsion polymerization of an ethylenically unsaturated nitrile monomer, a conjugated diene monomer, an ethylenically unsaturated acid monomer, and an ethylenically unsaturated monomer copolymerizable with these monomers using a specified polymerization initiator.

The polymerization initiator used in the present invention consists of a specified peroxide and a reducing agent.

The peroxide used in the present invention has a decomposition temperature giving a half-life period of 10 hours being 100° C. or higher. Specific examples (decomposition temperature) thereof include peroxides such as diisopropylbenzene hydroperoxide (122° C.), cumene hydroperoxide (158° C.), t-butyl hydroperoxide (167° C.), 1,1,3,3-tetramethylbutyl hydroperoxide (153° C.), and 2,5-dimethylhexane-2,5-dihydroperoxide (154° C.). In particular, peroxides having a decomposition temperature of 130° C. or higher such as 1,1,3,3-tetramethylbutyl hydroperoxide are used preferably since latexes can be prepared stably therewith and dip products can be obtained which have high mechanical strength and soft drape. The amount of the peroxide may vary depending on its kind and preferably it is 0.001 to 0.6% by weight of total monomers.

The reducing agent is not limited particularly so far as it is a reducing agent usually used in redox polymerization initiators. As such a reducing agent, there can be cited, for example, compounds having metal ions in a reduced state such as ferric sulfate, and copper naphthenate; amine such as dimethylaniline; and so on. These may be used singly or two or more of them may be used in combination.

Proportion of the peroxide to the reducing agent used in the present invention may vary slightly depending on the kind of the reducing agent used, and generally a proportion of peroxide/reducing agent is 0.1 to 30, preferably 0.3 to 20.

The emulsifying agent used in the present invention may be any one that is usually used in emulsion polymerization. There can be cited, for example, nonionic emulsifying agents such as polyoxyethylene alkyl ether, polyoxyethylene alkylphenol ether, polyoxyethylene alkyl ester, and polyoxyethylene sorbitan alkyl ester; anionic emulsifying agents such as fatty acids, e.g., myristic acid, palmitic acid, oleic acid, rinoleic acid, and salts thereof, alkylarylsulfonic acid salts, sulfuric acid esters of higher alcohols, alkyl sulfosuccinates, etc.; cationic emulsifying agent such as trimethyl ammonium chloride, dialkylammonium chloride, benzylammonium salt, and quaternary ammonium salts; copolymerizable emulsifying agents having a double bond such as $\alpha,\beta$-unsaturated carboxylic acid sulfoesters, $\alpha,\beta$-unsaturated sulfate esters, sulfoalkyl aryl ethers; and so on.

The amount of the emulsifying agent is not limited particularly, and it is used usually in an amount of 0.1 to 9.0% by weight, and preferably 0.5 to 0.6% by weight.

In the method of the present invention, polymerization temperature is not limited particularly so far as it is higher than the melting point of aqueous medium used. From a viewpoint of stability of polymerization reaction, it is preferred to perform the reaction at a low temperature as low as 40° C. or lower. If the polymerization temperature exceeds 40° C., polymerization rate becomes too high and when removal of heat is insufficient, runaway reaction may sometimes occur, which makes it difficult to control the reaction.

In the method of the present invention, auxiliary additives such as molecular weight modifiers, particle diameter adjusting agents, antioxidants, chelating agents, and oxygen trapping agents can be added, if desired. Polymerization pressure, manner of adding monomers, type of polymerization reaction vessel, etc. are not limited particularly.

The molded product of the present invention consists essentially of a coagulated product of the aforementioned copolymer latex.

The coagulated product can be obtained by coagulating the latex using a known coagulating agent. Upon molding, the latex of the present invention may be used singly or with one or more other polymer latexes such as natural rubber latex and isoprene rubber latex.

While the solids content of the latex used when molding is not limited particularly and it is usually 20 to 55% by weight, and preferably 30 to 50% by weight.

The latex may be blended with vulcanizing agents, vulcanizing accelerators, antioxidants, fillers, thickening agents, etc., if desired. Manner of blending is not limited particularly. There can be cited, for example, methods in which generally used kneaders, dispersers such as disper, etc. are used.

As the coagulating agent, there can be used, for example, metal salt coagulating agents such as calcium chloride, calcium nitrate, and calcium acetate, acid coagulating agents such as formic agent, and acetic acid, heat sensitive coagulating agents such as polyvinyl methyl ether, and polypropylene glycol.

The coagulating agent may be used as it is or as a solution in water, organic solvents, or mixture of water with an organic solvent. As the organic solvent, there can be used those which can dissolve the coagulating agent such as alcohol and ketone.

In particular, in dip molding, calcium-chloride containing solutions are preferred as a coagulating agent. The use of this coagulating agent gives a dip molded product which has an average film thickness of 0.05 mm or more, and below 0.3 mm, a monodispersibility ratio of film thickness of 8% or less, and soft drape.

In a solution containing calcium chloride, calcium chloride may be replaced partly by other coagulating agents. When calcium chloride is partly replaced by other coagulating agents, the amount of replacement is below 30% by weight, and preferably 10% by weight, of calcium chloride. If the amount of coagulating agents other than calcium chloride exceeds 30% by weight, no dip molded product can be obtained that has a uniform film thickness.

The concentration of the solution containing a coagulating agent is usually 5 to 70% by weight. In particular, use of the solution in a concentration of 5 to 40% by weight can give rise to a dip molding product having an average film thickness of 0.05 mm or more and below 0.3 mm and having a uniform film thickness.

The solution containing a coagulating agent may if desired contain lubricants, fillers, etc. As the lubricant, there can be used nonionic surfactants, anionic surfactants, etc. As the fillers, there can be cited, for example, silica sol, talc, calcium carbonate, magnesium carbonate, etc.

The molded products of the present invention are not limited by molding method. For example, dip molded products can be molded by an anode method in which a mold is dipped in a solution containing a coagulating agent, and withdrawn therefrom, and then it is subsequently dipped in a latex to have the latex coagulated thereon and withdrawn from the latex, or a Teague method in which a mold is dipped in a latex and withdrawn therefrom and subsequently dipped in a solution containing a coagulating agent to coagulate the latex and withdrawn from the solution. Anode method is preferred in order to obtain dip molded product having an average film thickness of 0.05 mm or more and below 0.3 mm.

After the molding, warm water treatment or heat treatment may be carried out, if desired. Warm water treatment or heat treatment can remove calcium chloride, lubricant, etc. Warm water treatment is performed, for example, by dipping the mold to which latex is coagulated in warm water. Heat treatment is performed, for example, by placing the mold to which latex is coagulated in an oven or the like, or by irradiating the mold to which latex is coagulated with infrared rays.

Thus, according to the present invention, a copolymer latex having excellent oil resistance and high mechanical strength and soft drape can be obtained. Also, according to the present invention, a method for preparing a carboxyl-modified nitrile/diene copolymer latex having a high content of nitrile, a high molecular weight and a low methyl ethyl ketone insoluble matter is provided. Further, in accordance with the present invention, a molded product having high oil resistance and high mechanical strength as well as soft drape can be obtained.

Hereinafter, the present invention will be described in more detail by examples. Unless otherwise indicated specifically, all parts and percentages (%) in the examples are by weight.

Evaluation method for latex is as follows.

[Molecular Weight]

Copolymer was dissolved in tetrahydrofuran and the resulting solution was examined by gel permeation chromatography (carrier: tetrahydrofuran) using a calibration curve obtained on standard polystyrene.

[MEK Insoluble Matter]

Latex was cast on a glass plate with a frame, and allowed to stand at 25° C. for 4 days to form a film. A predetermined amount (weight $W_0$) of the film was precisely weighed, and put in a metal cage of 80 mesh. The cage was dipped in methyl ethyl ketone at 20° C. for 48 hours. Then the cage was taken out and dried in vacuum at 25° C. for 2 days. Thereafter, the residual copolymer which remained undissolved in the cage was precisely weighed to obtain weight $W_1$. Percentage of $W_1$ to $W_0$ was calculated.

[Mechanical Stability]

According to mechanical stability prescribed by JIS-K6392 measurement was carried out under the conditions of a load of 10 kg, 10 minutes and 100 mesh.

Evaluation method for dip molded products is as follows.

[Drape]

Test pieces obtained by blanking dip molded product using Dumbbell Variation No. 2 (small type) were stretched at a stretch rate of 200 mm/minute, and tensile strengths when the elongation ratio was 300% were measured. Smaller values indicate softer drape.

[Tensile Strength]

Test pieces obtained by blanking dip molded product using Dumbbell Variation No. 2 (small type) were stretched at a stretch rate of 200 mm/minute, and tensile strengths (Tb) and elongation ratio (T1) just before breakage were measured.

[Tear Strength]

Test pieces obtained by blanking dip molded product using Dumbbell JIS B type were torn at a tearing rate of 500 mm/minute, and tear strengths just before breakage were measured.

[Oil Resistance]

Test pieces obtained by blanking dip molded product into disks of 20 mm in diameter were dipped in a predetermined test oil for 48 hours, and then surface areas of the test pieces were measured. Difference in area before and after dipping was divided by the area before dipping. Smaller value (area expansion ratio) indicates increased oil resistance.

[Film Thickness and Its Monodispersibility Ratio]

Film thickness of a dip molded product was measured for 20 positions, and average and standard deviation were calculated. Film thickness was shown as average value. Monodispersibility ratio of film thickness was expressed as percentage of the standard deviation to the average value.

[Smoothness of Film Surface]

A dip molded product was cut with a cutter, and the resulting cut surface was observed using an optical microscope. Film surface was evaluated based on the following rating.

o ... No unevenness and smooth.
Δ ... Minute unevenness or edges.
x ... Large unevenness.

EXAMPLE 1

In a nitrogen-purged reaction vessel were charged 38.0 parts of acrylonitrile, 59.5 parts of 1,3-butadiene, 2.5 parts of methacrylic acid, 0.3 part of a molecular weight modifier (TDM: t-dodecylmercaptan), 0.1 part of 1,1,3,3-tetramethylbutyl hydroperoxide, 0.008 part of ferric sulfate, 120 parts of soft water, and 6.0 parts of emulsifying agent (Warolato u: product of Toshin Kagaku Co., Ltd.), and stirred for 40 hours at 5° C. for polymerization. After completion of polymerization, solids content was adjusted to 45% to obtain Latex A. Results of evaluation of Latex A are shown in Table 1.

EXAMPLE 2 TO 11

Latexes B to K having solids content of 45% were prepared in the same manner as in Example 1 except that in the preparation of Latex A composition of monomer, amount of molecular weight modifier, or polymerization initiator was changed. Results of evaluation of these latexes are shown in Table 1.

Comparative Example 1

Latex L was obtained in the same manner as in Example 1 except that ammonium persulfate (APS) instead of TMB was used as the polymerization initiator.

Comparative Example 2

Latex M was obtained in the same manner as in Example 1 except that APS instead of TMB was used as the polymerization initiator, and the amount of TDM and polymerization temperature were changed.

Comparative Example 3

Latex N was obtained in the same manner as in Example 1 except that the amount of TDM was decreased.

Comparative Examples 4 to 7

Latexes O to R were obtained in the same manner as in Example 1 except that polymerization formula shown in Table 2 was followed.

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Latex | A | B | C | D | E | F | G | H | I | J | K |
| (Monomer) (part) | | | | | | | | | | | |
| Acrylonitrile | 38.0 | 43.0 | 24.0 | 11.0 | 38.0 | 38.0 | 38.0 | 38.0 | 38.0 | 38.0 | 38.0 |
| 1,3-Butadiene | 59.5 | 43.0 | 73.5 | 83.5 | 56.5 | 56.5 | 56.3 | 53.5 | 56.5 | 56.5 | 56.5 |

TABLE 1-continued

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Latex | A | B | C | D | E | F | G | H | I | J | K |
| Methacrylic acid | 2.5 | 14.0 | 5.5 | 5.5 | 5.5 | 5.5 | 5.5 | 5.5 | 5.5 | 5.5 | 5.5 |
| Butyl acrylate | — | — | — | — | — | — | 3.0 | — | — | — | — |
| TDM (part) | 0.3 | 0.3 | 0.3 | 0.3 | 0.2 | 0.4 | 0.3 | 0.3 | 0.2 | 0.1 | 0.2 |
| Emulsifying agent | 6.0 | 6.0 | 6.0 | 6.0 | 6.0 | 6.0 | 6.0 | 6.0 | 6.0 | 6.0 | 6.0 |
| Soft water | 120 | 120 | 120 | 120 | 120 | 120 | 120 | 120 | 120 | 120 | 120 |
| Polymerization initiator *1 | TMB | TMB | TMB | TMB | TMB | TMB | TMB | TMB | TMB | TMB | DIP |
| Polymerization temperature (°C.) | 5 | 5 | 5 | 8 | 5 | 10 | 25 | 5 | 5 | 4 | 5 |
| (Physical properties of latex) | | | | | | | | | | | |
| Solids content (%) | 45 | 45 | 45 | 45 | 45 | 45 | 45 | 45 | 45 | 45 | 20 |
| MEK insoluble matter (%) | 5 | 10 | 0 | 3 | 1 | 0.5 | 2 | 2 | 43 | 3 | 7 |
| Molecular weight ($10^4$) | 13 | 10 | 11 | 12 | 18 | 7 | 14 | 12 | 20 | 38 | 11 |
| Mechanical stability (%) | 0.1 | 0.2 | 0.3 | 0.2 | 0.2 | 0.3 | 0.2 | 0.1 | 0.3 | 0.2 | 0.2 |
| Polymerization conversion (%) | 98 | 97 | 96 | 97 | 99 | 98 | 98 | 99 | 98 | 97 | 56 |

Notes:
*1 TMB: 0.1 part of 1,1,3,3-tetramethylbutyl hydroperoxide (half-life period is 10 hours at a temperature of 153° C.) and 0.008 part of ferric sulfate
DIP: 0.1 part of diisopropylbenzene hydroperoxide (half-life period is 10 hours at at temperature of 122° C.) and 0.008 part of ferric sulfate

TABLE 2

| | Comparative Example No. | | | | | | |
|---|---|---|---|---|---|---|---|
| | 1 | 2 | 3 | 4 | 5 | 6 | 7 |
| Latex | L | M | N | O | P | Q | R |
| (Monomer) (part) | | | | | | | |
| Acrylonitrile | 38.0 | 38.0 | 38.0 | 56.0 | 2.5 | 35.0 | 40.0 |
| 1,3-Butadiene | 56.5 | 56.5 | 56.5 | 28.5 | 95.0 | 40.0 | 60.0 |
| Methacrylic acid | 5.5 | 5.5 | 5.5 | 15.5 | 2.5 | 25.5 | 0.0 |
| TDM (part) | 0.3 | 0.6 | 0.05 | 0.4 | 0.4 | 0.3 | 0.3 |
| Emulsifying agent | 6.0 | 6.0 | 6.0 | 6.0 | 6.0 | 6.0 | 6.0 |
| Soft water | 120 | 120 | 120 | 120 | 120 | 120 | 120 |
| Polymerization initiator *1 | APS | APS | TMB | TMB | TMB | TMB | TMB |
| Polymerization temperature (°C.) | 44 | 45 | 4 | 5 | 15 | 5 | 5 |
| (Physical properties of latex) | | | | | | | |
| Solids content (%) | 45 | 45 | 45 | 45 | 45 | 45 | 45 |
| MEK insoluble matter (%) | 62 | 16 | 25 | 2 | 0 | 6 | 0 |
| Molecular weight ($10^4$) | 13 | 3 | 54 | 7 | 7 | 9 | 12 |
| Mechanical stability (%) | 0.7 | 0.6 | 0.8 | 0.9 | 0.8 | 0.7 | 0.8 |

Notes:
*1 TMB: 0.1 part of 1,1,3,3-tetramethylbutyl hydroperoxide (half-life period is 10 hours at a temperature of 153° C.) and 0.008 part of ferric sulfate
APS: 0.3 part of ammonium persulfate Results of evaluation of Latexes L to R are shown in Table 2.

From the results shown in Tables 1 and 2 above, it can be seen that when emulsion polymerization is performed using ammonium persulfate as polymerization initiator, latexes of copolymers having low molecular weights are obtained or those of copolymers containing a large amount of methyl ethyl ketone insoluble matter were obtained.

On the other hand, it is understood that emulsion polymerization performed using a polymerization initiator consisting of a peroxide whose decomposition temperature giving a half-life period of 10 hours is 100° C. or higher can give rise to latexes having a high content of nitrile, a high molecular weight, and a low content of methyl ethyl ketone insoluble matter.

EXAMPLE 12

To 220 parts of Latex A (solids content: 45%) obtained in Example 1 was added 17 parts of a vulcanizing agent solution having a solids content of 50% and prepared by mixing 0.5 part of sulfur, 5.0 parts of zinc oxide, 3.0 parts of titanium oxide, 0.2 part of 10% ammonia casein, and 8.3 parts of water to obtain a latex for molding.

On the other hand, a glove mold was dipped for 1 minute in a coagulating agent solution having a solids content of 66% and prepared by mixing 65 parts of calcium nitrate, 1 part of a nonionic emulsifying agent (Emulgen-810: Kao Co., Ltd.), and 34 parts of water. After taking out from the solution, the mold was dried at 20° C. for 3 minutes to have the coagulating agent adhered to the glove mold.

Then the glove mold to which the coagulating agent adhered was dipped in the aforementioned latex for molding for 6 minutes. After taking out from the latex, the glove mold was dried at 20° C. for 3 minutes. Next, the glove mold was dipped in warm water at 35° C. for 6 minutes. After taking out from the water, the glove mold was heated at 80° C. for 20 minutes and then at 130° C. for 20 minutes to form a solid film on the surface of the glove mold. Finally, the solid film was peeled off from the glove mold to obtain a dip molded product in the form of a glove. Results of evaluation of the dip molded product thus obtained are shown in Table 3.

EXAMPLES 13 TO 21

Dip molded products were obtained in the same manner as in Example 12 except that Latex A was replaced by one of Latexes B to J. Results of evaluation of the dip molded products are shown in Table 3.

Comparative Examples 8 to 14

Dip molded products were prepared in the same manner as in Example 12 except that Latex A was replaced by one of Latexes L to R. Results of evaluation of the dip molded products thus obtained are shown in Table 4.

weight based on the weight of total monomers has a hard drape.

TABLE 3

| Latex | Example No. | | | | | | | | | |
|---|---|---|---|---|---|---|---|---|---|---|
| | 12 A | 13 B | 14 C | 15 D | 16 E | 17 F | 18 G | 19 H | 20 I | 21 J |
| (Physical property of dip molded product) | | | | | | | | | | |
| Thickness (mm) | 0.33 | 0.32 | 0.37 | 0.34 | 0.34 | 0.39 | 0.35 | 0.38 | 0.34 | 0.33 |
| Drape (Kg/cm$^2$) | 34 | 56 | 37 | 35 | 35 | 29 | 31 | 32 | 53 | 55 |
| Tensile strength Tb (Kg/cm$^2$) | 320 | 390 | 310 | 300 | 342 | 300 | 310 | 320 | 280 | 370 |
| El (%) | 700 | 560 | 750 | 640 | 745 | 760 | 750 | 710 | 550 | 430 |
| Tear strength (Kg/cm$^2$) | 50.1 | 37.3 | 47.9 | 48.0 | 49.5 | 49.8 | 48.5 | 48.1 | 48.5 | 42.2 |
| Oil resistance (%) | | | | | | | | | | |
| JIS #3 | 0 | 1 | 1 | 7 | 0 | 0 | 0 | 3 | 5 | 0 |
| Squid oil | 5 | 6 | 10 | 13 | 1 | 2 | 1 | 4 | 5 | 0 |
| gasoline | 16 | 17 | 21 | 39 | 19 | 20 | 17 | 20 | 20 | 21 |

TABLE 4

| Latex | Comparative Example No. | | | | | | | | |
|---|---|---|---|---|---|---|---|---|---|
| | 8 L | 9 M | 10 N | 11 O | 12 P | 13 Q | 14 R | 15 1* | 16 2* |
| (Physical property of dip molded product) | | | | | | | | | |
| Thickness (mm) | 0.33 | 0.36 | 0.39 | 0.37 | 0.35 | 0.34 | 0.38 | 1.10 | 1.6 |
| Drape (Kg/cm$^2$) | 130 | 82 | 150 | 140 | 38 | 145 | 50 | 38 | 25 |
| Tensile strength Tb (Kg/cm$^2$) | 290 | 110 | 300 | 360 | 45 | 280 | 70 | 182 | 72 |
| El (%) | 410 | 380 | 390 | 410 | 700 | 340 | 550 | 660 | 430 |
| Tear strength (Kg/cm$^2$) | 36.4 | 36.1 | 37.5 | 39.0 | 24.0 | 35.0 | 40.0 | 53.9 | 25.3 |
| Oil resistance (%) | | | | | | | | | |
| JIS #3 | 2 | 5 | 3 | 0 | 65 | 4 | 2 | 69 | 0 |
| Squid oil | 5 | 10 | 3 | 0 | 40 | 10 | 3 | 38 | −17 |
| gasoline | 27 | 29 | 25 | 18 | 100 | 17 | 20 | 160 | −28 |

Notes:
*1: Natural rubber latex
*2: Vinyl chloride sol

Comparative Example 15

Dip molded products were prepared in the same manner as in Example 12 except that Latex A was replaced by natural rubber latex. Results of evaluation of the dip molded product thus obtained are shown in Table 4.

Comparative Example 16

Dip molded products were prepared in the same manner as in Example 12 except that Latex A was replaced by vinyl chloride sol. Results of evaluation of the dip molded product thus obtained are shown in Table 4.

From the results shown in Tables 3 and 4, it can be seen that the dip molded product obtained from Latex P containing the ethylenically unsaturated nitrile monomer in an amount of below 9% by weight based on the weight of total monomers has a poor oil resistance, and low tensile strength and low tear strength while the dip molded product obtained from Latex O which contains the ethylenically unsaturated nitrile monomer in an amount of above 50% by weight has a hard drape.

Also, it can be seen that the dip molded product obtained from Latex R containing the ethylenically unsaturated nitrile monomer in an amount of below 0.1% by weight based on the weight of total monomers has a low tensile strength while the dip molded product obtained from Latex Q which contains the ethylenically unsaturated nitrile monomer in an amount of above 20% by weight has a hard drape and a low tear strength.

Further, it is understood that the dip molded product obtained from Latex N containing the methyl ethyl ketone insoluble matter in an amount of above 50% by weight based on the weight of total monomers has a hard drape.

It is apparent that the dip molded product obtained from Latex M which has a molecular weight above 500,000 has a hard drape while the dip molded product obtained from Latex L which has a molecular weight below 50,000 has a low tensile strength.

The dip molded products obtained from the conventional natural rubber latex or vinyl chloride sol have poor oil resistances and low tensile strengths.

In contrast thereto, it is understood that the dip molded products obtained from the latexes of the present invention are excellent in oil resistance, and have high mechanical strengths such as tensile strength and tear strength as well as soft drape.

EXAMPLES 22 TO 25

Dip molded products were obtained in the same manner as in Example 12 except that the coagulating agent solution was replaced by one of formulae shown in Table 5. Results of evaluation of the dip molded products are shown in Table 5.

From the results shown in Table 5, it will be understood that coagulation dip molding a latex using a coagulating solution containing calcium chloride can give rise to a dip molded product having a uniform film thickness and a soft drape even when the average film thickness is below 0.3 mm.

TABLE 5

| Latex | Example No. | | | |
|---|---|---|---|---|
| | 22 A | 23 C | 24 D | 25 A |
| (Coagulating solution) (part) | | | | |
| Water | 79 | 86 | 79 | 79 |

TABLE 5-continued

| Latex | Example No. 22 A | 23 C | 24 D | 25 A |
|---|---|---|---|---|
| Emulgen-810 | 1 | 1 | 1 | 1 |
| Calcium chloride | 20 | 13 | 20 | — |
| Calcium nitrate | — | — | — | 20 |
| (Physical property of dip molded product) | | | | |
| Average film thickness (mm) | 0.21 | 0.12 | 0.19 | 0.22 |
| Film thickness monodispersibility ratio (%) | 3.9 | 6.2 | 6.9 | 13.7 |
| Smoothness of film surface | ○ | ○ | ○ | Δ |
| Strength (Kg/cm$^2$) | 340 | 350 | 280 | 350 |
| Drape (Kg/cm$^2$) | 34 | 49 | 40 | 41 |

Notes:
○ ... No unevenness and smooth.
Δ ... Minute unevenness or edges.
x ... Large unevenness.

What is claimed is:

1. A copolymer latex comprising 30 to 90% by weight of a conjugated diene monomer unit, 9 to 50% by weight of an ethylenically unsaturated nitrile monomer unit, 0.1 to 20% by weight of an ethylenically unsaturated acid monomer unit, and 0 to 20% by weight of an other ethylenically unsaturated monomer unit copolymerizable therewith, having a polystyrene-converted weight average molecular weight of 50,000 to 500,000, and containing 45% or less of a methyl ethyl ketone insoluble matter, wherein said copolymer latex is obtained by emulsion polymerization of said monomers using a polymerization initiator selected from the group consisting of diisopropylbenzene hydroperoxide, cumene hydroperoxide, 1,1,3,3-tetramethylbutyl hydroperoxide and 2,5-dimethylhexane-2,5-dihydroperoxide.

2. The copolymer latex as claimed in claim 1, wherein said ethylenically unsaturated nitrile monomer unit is present in an amount of 30 to 45% by weight, and said methyl ethyl ketone insoluble matter is present in an amount of 10% or less.

3. A method for preparing a copolymer latex, comprising the step of:
emulsion polymerizing 30 to 90% by weight of a conjugated diene monomer, 9 to 50% by weight of an ethylenically unsaturated nitrile monomer, 0.1 to 20% by weight of an ethyenically unsaturated acid monomer, and 0 to 20% by weight of an other ethylenically unsaturated monomer copolymerizable therewith using a polymerization initiator consisting of a peroxide whose decomposition temperature giving a half-life period of 10 hours is 100° C. or higher, wherein said polymerization initiator is selected from the group consisting of diisopropylbenzene hydroperoxide, cumine hydroperoxide, 1,1,3,3-tetramethybutyl hydroperoxide and 2,5-dimethylhexane-2,5-dihydroperoxide, and a reducing agent.

4. The method for preparing a copolymer latex as claimed in claim 3, wherein said peroxide is 1,1,3,3-tetramethylbutyl hydroperoxide.

5. The method for preparing a copolymer latex as claimed in claim 3, wherein said emulsion polymerization is performed at a polymerization temperature of 40° C. or lower.

6. A molded product consisting essentially of a coagulated product of said copolymer latex as claimed in claim 1.

7. The copolymer latex of claim 1 wherein said polymerization initiator has a decomposition temperature giving a half-life period of 10 hours of 100° C. or higher.

8. A copolymer latex comprising 35 to 80% by weight of a conjugated diene monomer unit, 20 to 45% by weight of an ethylenically unsaturated nitrile monomer unit, 1.0 to 15% by weight of an ethylenically unsaturated acid monomer unit, and 0 to 20% by weight of an other ethylenically unsaturated monomer unit copolymerizable therewith, having a polystyrene-converted weight average molecular weight of 50,000 to 500,000, and containing 45% or less of a methyl ethyl ketone insoluble matter, wherein said copolymer latex is obtained by emulstion polymerization of said monomers using a polymerization initiator consisting essentially of 1,1,3,3-tetramethylbutyl hydroperoxide.

9. The copolymer latex as claimed in claim 8, wherein said ethylenically unsaturated nitrile monomer unit is present in an amount of 30 to 45% by weight, and said methyl ethyl ketone insoluble matter is present in an amount of 10% or less.

10. The copolymer latex of claim 8 wherein said polymerization initiator has a decomposition temperature giving a half-life period of 10 hours of 100° C. or higher.

11. A method for preparing a copolymer latex, comprising the step of:
emulsion polymerizing 35 to 80% by weight of a conjugated diene monomer, 20 to 45% by weight of an ethylenically unsaturated nitrile monomer, 1.0 to 15% by weight of an ethylenically unsaturated acid monomer, and 0 to 20% by weight of an other ethylenically unsaturated monomer copolymerizable therewith, at a temperature of 40° C. or lower using a polymerization initiator consisting of a peroxide whose decomposition temperature giving a half-life period of 10 hours is 100° C. or higher wherein said polymerization initiator consists essentially of 1,1,3,3-tetramethylbutyl hydroperoxide, and a reducing agent.

12. A molded product consisting essentially of a cogaulated product of said copolymer latex as claimed in claim 8.

* * * * *